(12) United States Patent
Pai et al.

(10) Patent No.: US 11,146,031 B2
(45) Date of Patent: Oct. 12, 2021

(54) EXPANSION DEVICE

(71) Applicant: Acer Incorporated, New Taipei (TW)

(72) Inventors: Ting-Wen Pai, New Taipei (TW);
Wen-Chieh Tai, New Taipei (TW);
Han-Tsung Shen, New Taipei (TW);
Yu-Shih Wang, New Taipei (TW)

(73) Assignee: Acer Incorporated, New Taipei (TW)

( * ) Notice: Subject to any disclaimer, the term of this patent is extended or adjusted under 35 U.S.C. 154(b) by 167 days.

(21) Appl. No.: 16/667,889

(22) Filed: Oct. 29, 2019

(65) Prior Publication Data
US 2020/0335924 A1    Oct. 22, 2020

(30) Foreign Application Priority Data

Apr. 17, 2019 (TW) .................................. 108113430

(51) Int. Cl.
| | | |
|---|---|---|
| *H01R 33/76* | (2006.01) | |
| *H01R 33/94* | (2006.01) | |
| *G06F 1/16* | (2006.01) | |
| *H01R 33/90* | (2006.01) | |
| *H01R 33/945* | (2006.01) | |
| *H01R 13/62* | (2006.01) | |

(52) U.S. Cl.
CPC ....... *H01R 33/7671* (2013.01); *G06F 1/1632* (2013.01); *H01R 13/6205* (2013.01); *H01R 33/7664* (2013.01); *H01R 33/90* (2013.01); *H01R 33/94* (2013.01); *H01R 33/945* (2013.01); *H01R 2201/06* (2013.01)

(58) Field of Classification Search
CPC .......................... H01R 33/7671; H01R 33/90;
H01R 33/7664; H01R 33/94; H01R 33/945; H01R 13/6205; H01R 2201/06; G06F 1/1632
See application file for complete search history.

(56) References Cited

U.S. PATENT DOCUMENTS 6,101,087 A  *  8/2000  Sutton ................. B60R 11/0252
361/679.44
6,426,872 B1 *  7/2002  Sutton ................. B60R 11/0252
361/679.41

(Continued)

FOREIGN PATENT DOCUMENTS

| CN | 102679107 | 9/2012 |
|---|---|---|
| CN | 105846262 | 8/2016 |

(Continued)

*Primary Examiner* — Abdullah A Riyami
*Assistant Examiner* — Nader J Alhawamdeh
(74) *Attorney, Agent, or Firm* — JCIPRNET

(57) ABSTRACT

An expansion device includes a supporting base and a hub. The supporting base includes a bottom portion, a supporting portion, and an electrical connection port. The supporting portion is connected to the bottom portion and has an insert slot. The electrical connection port is disposed at the bottom portion. The hub is slidably disposed within the supporting portion and is located between the bottom portion and the insert slot. The hub includes a first electrical connection element and a second electrical connection element facing away from the first electrical connection element. The first electrical connection element is electrically connected to the electrical connection port, and the second electrical connection element extends into the insert slot. Another expansion device is also provided.

18 Claims, 9 Drawing Sheets

(56) References Cited

U.S. PATENT DOCUMENTS

| | | | | |
|---|---|---|---|---|
| 7,258,548 | B2* | 8/2007 | Lo | H01R 35/00 439/11 |
| 9,519,311 | B2* | 12/2016 | Wang | G06F 1/182 |
| 9,535,466 | B2* | 1/2017 | Chang | G06F 1/1654 |
| 2005/0059283 | A1* | 3/2005 | Lo | H01R 35/00 439/296 |
| 2008/0188125 | A1 | 8/2008 | Horiuchi et al. | |
| 2014/0185262 | A1* | 7/2014 | Hashimoto | F16M 13/00 361/809 |
| 2015/0341711 | A1* | 11/2015 | Chen | H04R 1/02 381/333 |
| 2016/0266616 | A1* | 9/2016 | Chang | G06F 1/1632 |
| 2020/0335924 | A1* | 10/2020 | Pai | H01R 33/945 |

FOREIGN PATENT DOCUMENTS

| | | |
|---|---|---|
| CN | 106339038 | 1/2017 |
| CN | 208508082 | 2/2019 |
| EP | 3373399 | 9/2018 |
| TW | 200907639 | 2/2009 |

\* cited by examiner

EXPANSION DEVICE

CROSS-REFERENCE TO RELATED APPLICATION

This application claims the priority benefit of Taiwan application serial no. 108113430, filed on Apr. 17, 2019. The entirety of the above-mentioned patent application is hereby incorporated by reference herein and made a part of this specification.

BACKGROUND OF THE DISCLOSURE

Field of the Disclosure

The disclosure relates to an expansion device, and in particular, to an expansion device for supporting an electronic device.

Description of Related Art

Common expansion devices may be used to support electronic devices such as tablet computers, smartphones, and notebook computers, and may be further electrically connected to the electronic devices to transmit power or signals. Specifically, the expansion device is provided with an electrical connection plug so that the electrical connection plug can be plugged into an electrical connection slot of the electronic device while the expansion device supports the electronic device. In general, the position of the electrical connection plug of the expansion device is unchangeable, and the position of the electrical connection slot of electronic devices of different brands may be different. Therefore, one single expansion device cannot be widely applicable to electronic devices of all brands.

SUMMARY OF THE DISCLOSURE

The disclosure provides an expansion device which has excellent applicability.

An expansion device according to an embodiment of the disclosure includes a supporting base and a hub. The supporting base includes a bottom portion, a supporting portion, and an electrical connection port. The supporting portion is connected to the bottom portion and has an insert slot. The electrical connection port is disposed at the bottom portion. The hub is slidably disposed within the supporting portion and is located between the bottom portion and the insert slot. The hub includes a first electrical connection element and a second electrical connection element facing away from the first electrical connection element. The first electrical connection element is electrically connected to the electrical connection port, and the second electrical connection element extends into the insert slot.

An expansion device according to another embodiment of the disclosure includes a supporting base, a hub, and an adapter. The supporting base includes a bottom portion, a supporting portion, and an electrical connection port. The supporting portion is connected to the bottom portion and has an insert slot. The electrical connection port is disposed at the bottom portion. The hub is slidably disposed within the supporting portion and is located between the bottom portion and the insert slot. The hub includes a first electrical connection element, a second electrical connection element facing away from the first electrical connection element, and a first positioning portion adjacent to the second electrical connection element. The first electrical connection element is electrically connected to the electrical connection port. The second electrical connection element and the first positioning portion are oriented toward the insert slot. The adapter is detachably disposed at the hub. The adapter is located between the hub and the insert slot. The adapter includes a third electrical connection element electrically connected to the second electrical connection element, a second positioning portion adjacent to the third electrical connection element, and an electrical connection plug facing away from the third electrical connection element. The first positioning portion directly faces the second positioning portion. The electrical connection plug extends into the insert slot.

Based on the above, in the expansion device of the disclosure, the position of the hub can be adjusted according to the position of the electrical connection slot of the electronic device. Accordingly, while the electronic device is mounted to the expansion device, the second electrical connection element of the hub can be accurately plugged into the electrical connection slot of the electronic device. In other words, the expansion device of the disclosure is widely applicable to electronic devices of different brands and is easy for the user to operate.

To make the aforementioned more comprehensible, several embodiments accompanied with drawings are described in detail as follows.

DESCRIPTION OF THE EMBODIMENTS

Figure 1:
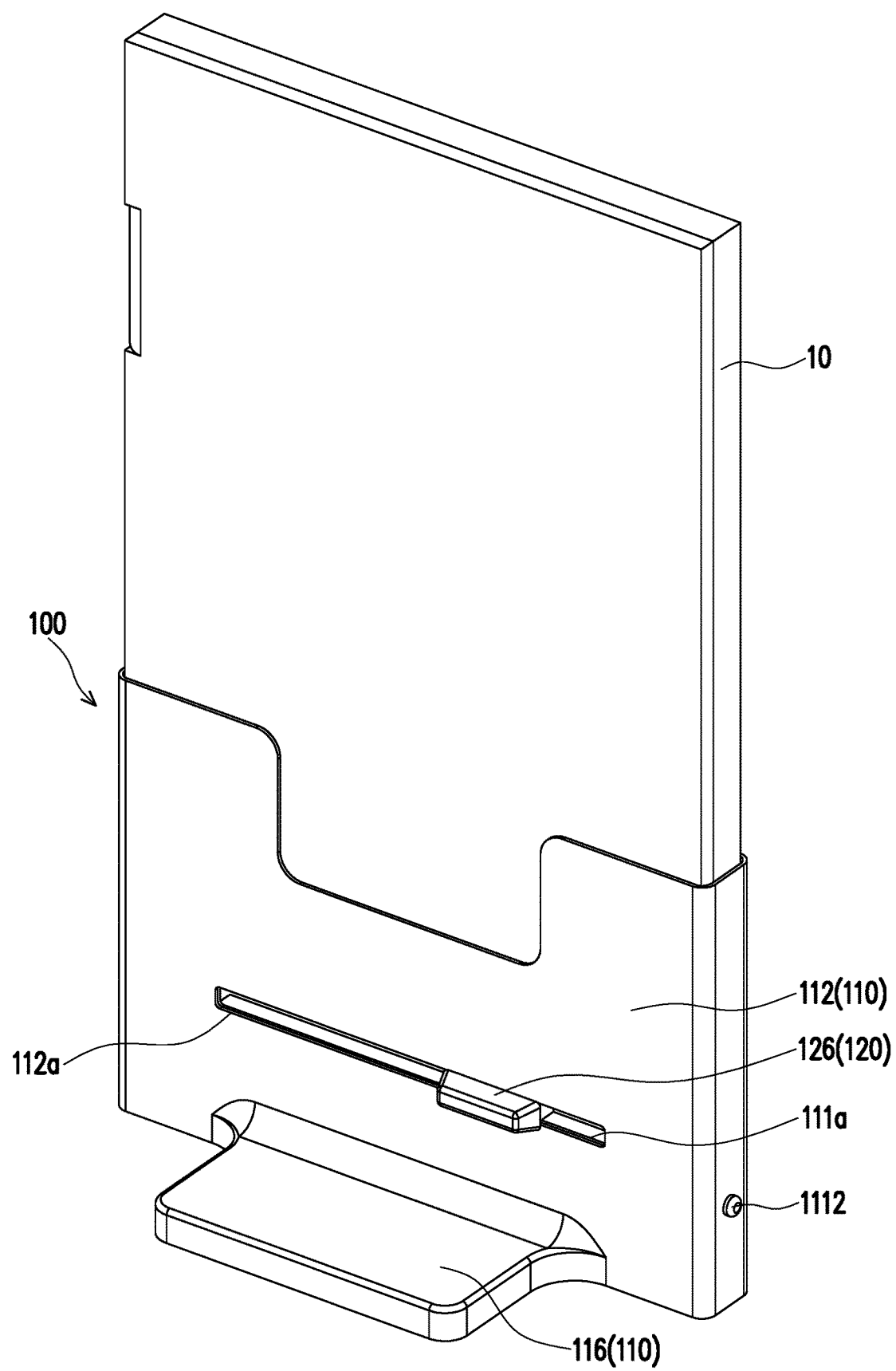
FIG. 1 is a schematic view of an expansion device supporting an electronic device according to an embodiment of the disclosure.
Figure 2A:
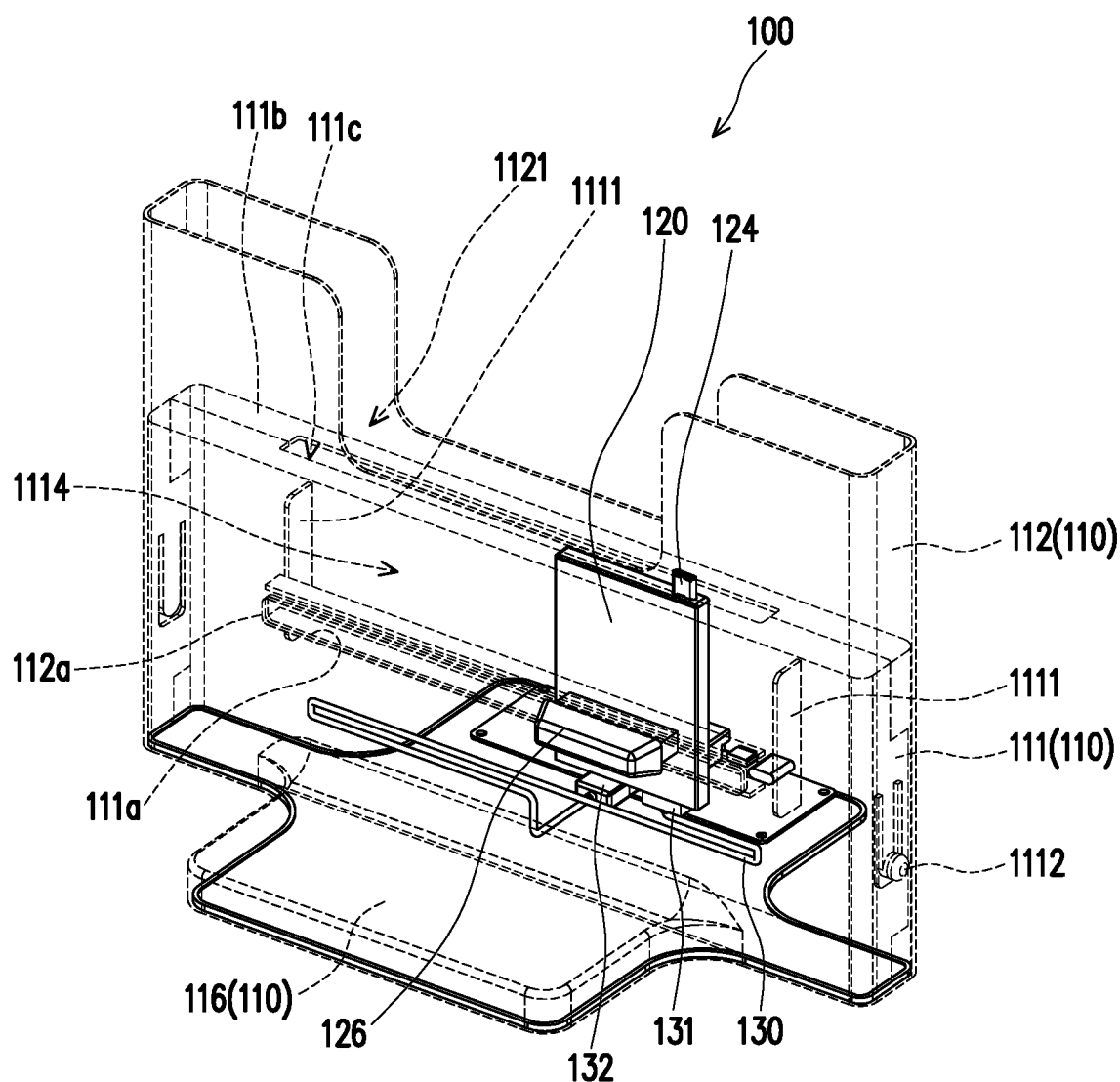
FIG. 2A is a schematic view of the expansion device of FIG. 1.
Figure 2B:
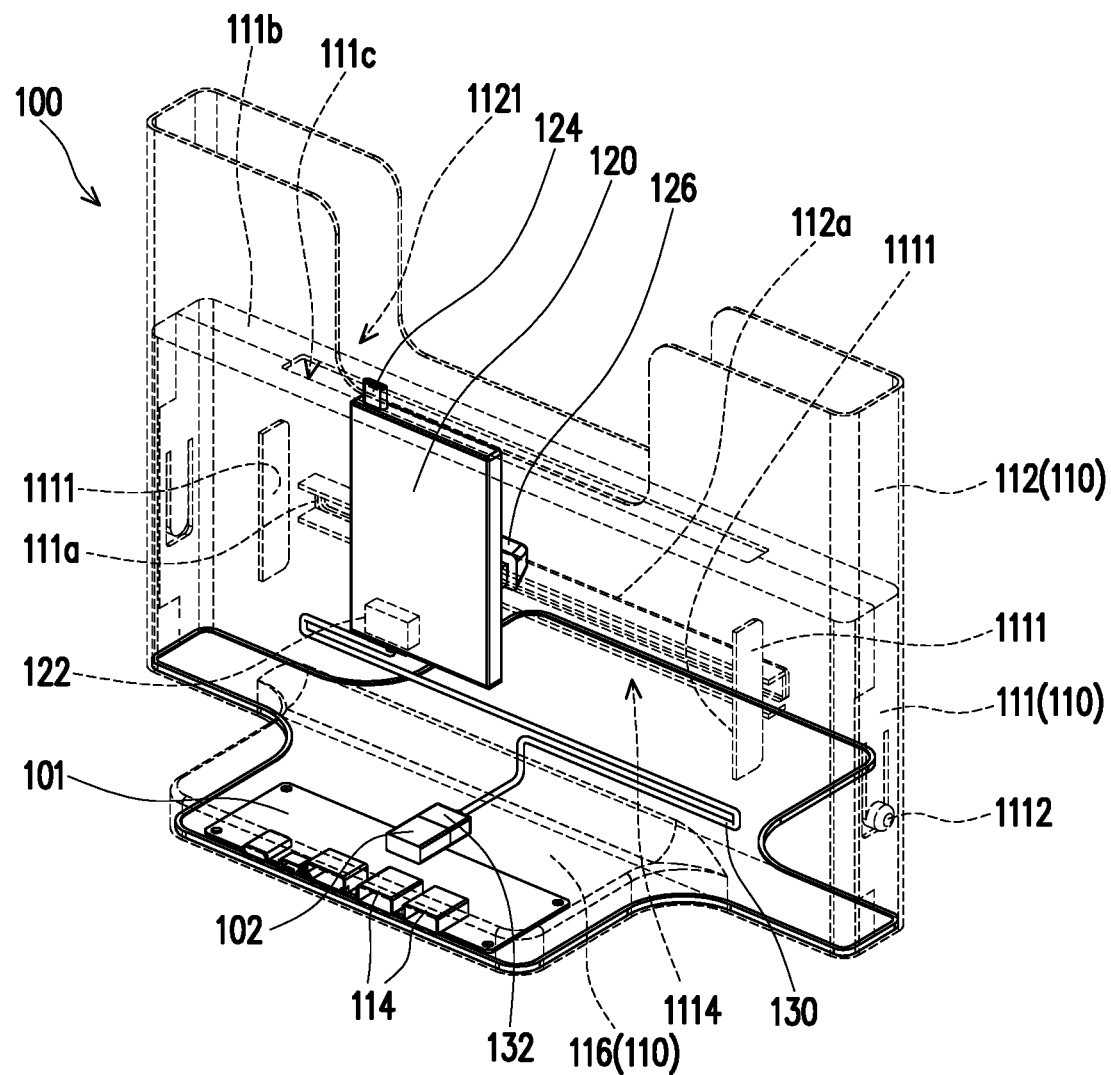
FIG. 2B is a schematic view of the expansion device of FIG. 2A from another perspective.

FIG. 1 is a schematic view of an expansion device supporting an electronic device according to an embodiment of the disclosure. FIG. 2A is a schematic view of the expansion device of FIG. 1. FIG. 2B is a schematic view of the expansion device of FIG. 2A from another perspective. In particular, at least a part of a supporting base 110 of FIG. 2A and FIG. 2B is shown in broken lines to clearly present the structural configuration within the supporting base 110. Referring to FIG. 1 first, in the present embodiment, an expansion device 100 may be used to support an electronic device 10 and may be electrically connected to the electronic device 10 to transmit power or signals. For example, the electronic device 10 may be a tablet computer, a notebook computer, or an electronic device in another form. The electronic device 10 has an electrical connection slot of which the transmission specification may be USB, USB 2.0, USB 3.0, USB 3.1, USB 3.2, mini USB, micro USB, or USB Type C. When the electronic device 10 is mounted on the expansion device 100, the side where the electrical connection slot is located of the electronic device 10 has to be inserted into the expansion device 100, so that an electrical connection plug of the expansion device 100 is plugged into the electrical connection slot of the electronic device 10 to thereby electrically connect the electronic device 10 to the expansion device 100.

Next, referring to FIG. 1, FIG. 2A, and FIG. 2B, in the present embodiment, the expansion device 100 includes a supporting base 110 and a hub 120. The hub 120 is slidably disposed within the supporting base 110, and the hub 120 is provided with an electrical connection plug to be matched with the electrical connection slot of the electronic device 10. The electrical connection plug of the hub 120 is exposed from the supporting base 110. Before mounting the electronic device 10 on the expansion device 100, the user may move the hub 120 and the electrical connection plug thereon to a determined position according to the position of the electrical connection slot of the electronic device 10, and then insert the side where the electrical connection slot is located of the electronic device 10 into the expansion device 100, so that the electrical connection plug of the hub 120 can be accurately plugged into the electrical connection slot of the electronic device 10. Therefore, the expansion device 100 is not only widely applicable to electronic devices of different brands, but is also easy for the user to operate.

Specifically, the supporting base 110 includes a bottom portion 116, a supporting portion 112, and an electrical connection port 114. The supporting portion 112 is connected to the bottom portion 116 and has an insert slot 1121. The hub 120 is slidably disposed within the supporting portion 112. The insert slot 1121 of the supporting portion 112 is configured for the electronic device 10 to be inserted therein, and the electrical connection plug of the hub 120 extends into the insert slot 1121. Therefore, after the user moves the hub 120 and the electrical connection plug thereon to the determined position and inserts the electronic device 10 into the insert slot 1121, the electrical connection plug of the hub 120 can be accurately plugged into the electrical connection slot of the electronic device 10. On the other hand, the bottom portion 116 may be used to improve the stability of the supporting base 110 when supporting the electronic device 10, which helps to prevent the supporting base 110 and the electronic device 10 mounted thereon from tipping over. In addition, the electrical connection port 114 is disposed at the bottom portion 116. The electrical connection port 114 is electrically connected to the hub 120, and an external device (e.g., a display or another electronic peripheral) may be electrically connected to the hub 120 through the electrical connection port 114. Therefore, the electronic device 10 mounted on the expansion device 100 can be electrically connected to the external device through the hub 120 and the electrical connection port 114 to transmit power or signals.

In the present embodiment, the hub 120 is disposed between the insert slot 1121 and the bottom portion 116 and includes a first electrical connection element 122 and a second electrical connection element 124 facing away from the first electrical connection element 122. The first electrical connection element 122 may be an electrical connection slot. The first electrical connection element 122 faces away from the insert slot 1121 and is electrically connected to the electrical connection port 114. The second electrical connection element 124 is the above-mentioned electrical connection plug and is plugged into the electrical connection slot of the electronic device 10. The second electrical connection element 124 is oriented toward the insert slot 1121 and extends into the insert slot 1121, and the transmission specification of the second electrical connection element 124 may be USB, USB 2.0, USB 3.0, USB 3.1, USB 3.2, mini USB, micro USB, or USB Type C.

For example, the expansion device 100 includes a switch circuit 130, and the switch circuit 130 is slidably disposed within the supporting portion 112. Specifically, the switch circuit 130 is located between the hub 120 and the bottom portion 116 and is used to electrically connect the first electrical connection element 122 and the electrical connection port 114. More specifically, the switch circuit 130 includes a first end portion 131 and a second end portion 132 opposite to each other. The first end portion 131 is plugged into the first electrical connection element 122, and the second end portion 132 is used to electrically connect the electrical connection port 114. More precisely, the electrical connection port 114 is disposed on a circuit board 101. The circuit board 101 is disposed at the bottom portion 116, and the circuit board 101 is provided with an electrical connection socket 102 for the second end portion 132 to be inserted therein. In other words, the electrical connection port 114 can be electrically connected to the electrical connection socket 102 through the circuit board 101, and further electrically connected to the hub 120 through the switch circuit 130.

It is noted that since the hub 120 can slide reciprocatingly in a specific direction within the supporting portion 112, the switch circuit 130 has to be provided in a sufficient length for moving along with the hub 120, so as to avoid obstructing the sliding of the hub 120.

Figure 3:
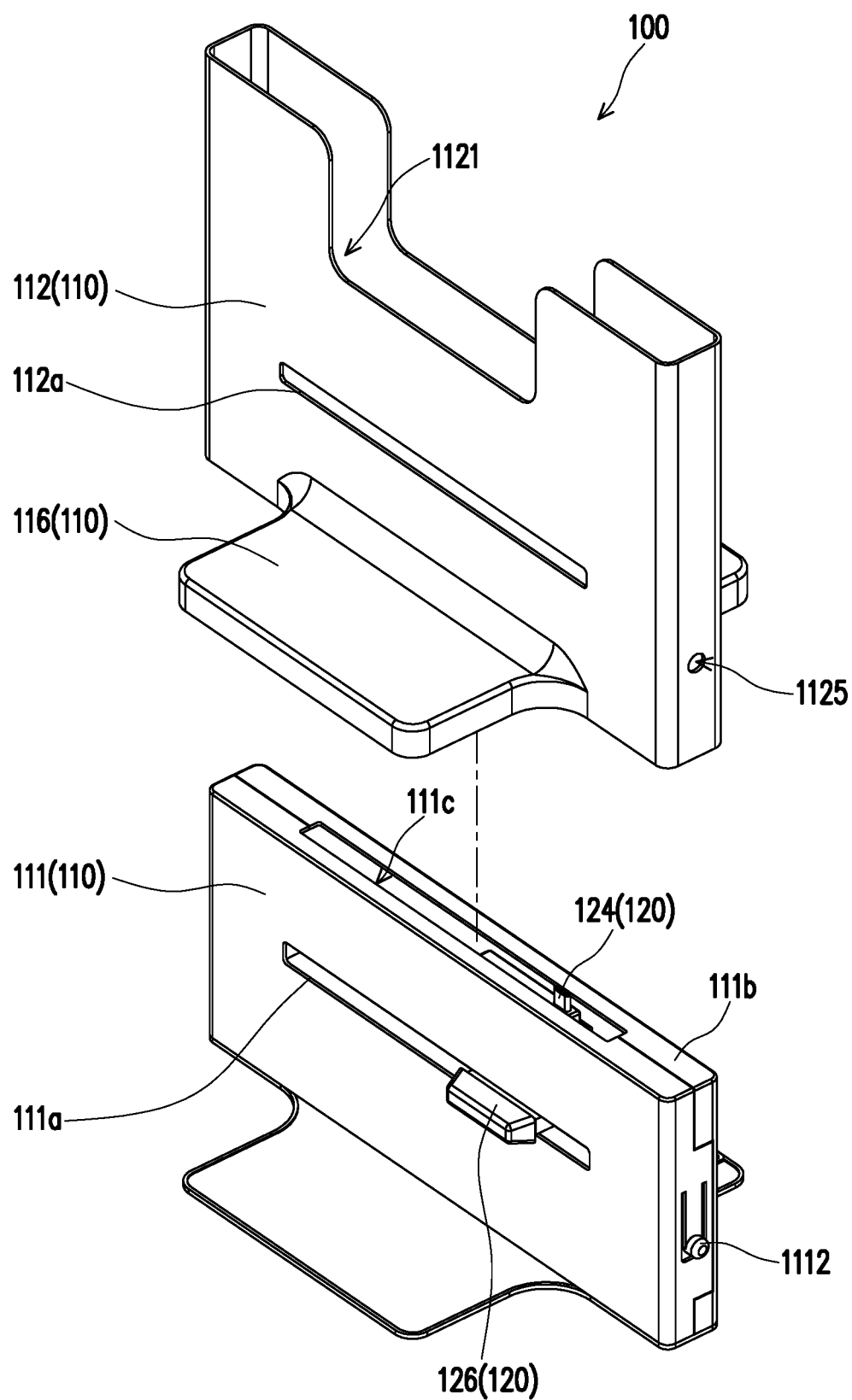
FIG. 3 is a schematic exploded view of the expansion device of FIG. 1.

FIG. 3 is a schematic exploded view of the expansion device of FIG. 1. Referring to FIG. 1, FIG. 2A, FIG. 2B, and FIG. 3, in the present embodiment, the supporting base 110 further includes a case portion 111. The supporting portion 112 may be a hollow structure, and the case portion 111 is detachably disposed within the supporting portion 112. The case portion 111 is located between the bottom portion 116 and the insert slot 1121. The hub 120 is slidably disposed within the case portion 111, and the second electrical connection element 124 penetrates out of the case portion 111 to extend into the insert slot 1121.

Specifically, the case portion 111 has a slide slot 1114, and the hub 120 is located within the slide slot 1114. For example, two limiting protruding portions 1111 that are arranged side by side are disposed inside the case portion 111. The two limiting protruding portions 1111 may be used to substantially define the extending direction and the extending length of the slide slot 1114 and are located on the sliding path of the hub 120. Therefore, the sliding direction and the sliding stroke of the hub 120 may be substantially determined by the slide slot 1114 and the two limiting protruding portions 1111. On the other hand, the case portion 111 includes a bearing wall 111b oriented toward the insert slot 1121. The insert slot 1121 and the slide slot 1114 are separated by the bearing wall 111b, and the second electrical connection element 124 of the hub 120 penetrates through the bearing wall 111b to extend into the insert slot 1121. When the electronic device 10 is inserted into the insert slot 1121, the bearing wall 111b may be used to support the electronic device 10, and the second electrical connection element 124 of the hub 120 can be plugged into the electrical connection slot of the electronic device 10.

In the present embodiment, the bearing wall 111b has a groove slot 111c for communicating the insert slot 1121 with the slide slot 1114. The second electrical connection element 124 penetrates through the groove slot 111c and is slidable within the groove slot 111c. Specifically, the second electrical connection element 124 may extend into the insert slot 1121 via the groove slot 111c, and the extending direction and the extending length of the groove slot 111c may substantially determine the sliding direction and the sliding stroke of the hub 120. Depending on the position of the electrical connection slot of the electronic device 10, the user may first move the second electrical connection element 124 to the appropriate position and then insert the electronic device 10 into the insert slot 1121, so that the second electrical connection element 124 can be accurately plugged into the electrical connection slot of the electronic device 10.

To facilitate user operation, the hub 120 is provided with a protruding block 126. The protruding block 126 is located between the first electrical connection element 122 and the second electrical connection element 124 and penetrates through the case portion 111 and the supporting portion 112 to be exposed from the supporting base 110. Specifically, a first guide slot 111a is disposed at a sidewall of the case portion 111 facing the supporting portion 112, and a second guide slot 112a is disposed at a sidewall of the supporting portion 112 facing the first guide slot 111a of the case portion 111. The first guide slot 111a and the second guide slot 112a are aligned and communicated with each other. The protruding block 126 penetrates through the first guide slot 111a and the second guide slot 112a and penetrates out of the supporting portion 112 via the second guide slot 112a. The protruding block 126 is slidable within the first guide slot 111a and the second guide slot 112a. The extending direction and extending length of the first guide slot 111a and the second guide slot 112a may substantially determine the sliding direction and the sliding stroke of the hub 120. Therefore, the extending directions of the slide slot 1114, the groove slot 111c, the first guide slot 111a, and the second guide slot 112a are substantially parallel to each other.

As shown in FIG. 1, FIG. 2B, and FIG. 3, to facilitate disassembly and assembly of the case portion 111, a positioning hole 1125 is provided at the inner side of the supporting portion 112, and an elastic positioning element 1112 corresponding to the positioning hole 1125 is provided at the outer side of the case portion 111. After the case portion 111 is mounted into the supporting portion 112, the elastic positioning element 1112 of the case portion 111 can be locked into the positioning hole 1125 of the supporting portion 112 to prevent the case portion 111 from easily sliding off from the supporting portion 112. For example, the elastic positioning element 1112 includes a positioning convex portion for locking into the positioning hole 1125. After the positioning convex portion is locked into the positioning hole 1125, the positioning convex portion is exposed from the supporting base 110. Therefore, the user may remove the locking relationship between the elastic positioning element 1112 and the positioning hole 1125 by pressing the positioning convex portion of the elastic positioning element 1112 to disassemble the case portion 111. On the other hand, the case portion 111 may be formed by engaging two plate elements. By disengaging the two plate elements, the hub 120 can be removed from the case portion 111. Conversely, by placing the hub 120 on one of the two plate elements and covering the hub 120 with the other one of the two plate elements to engage the two plate elements, the hub 120 can be positioned within the case portion 111.

Other embodiments will now be described below. In the embodiments, the same or similar structural configurations, design principles, and technical effects will not be repeatedly described, and the design differences between the embodiments will be mainly described.

Figure 4:
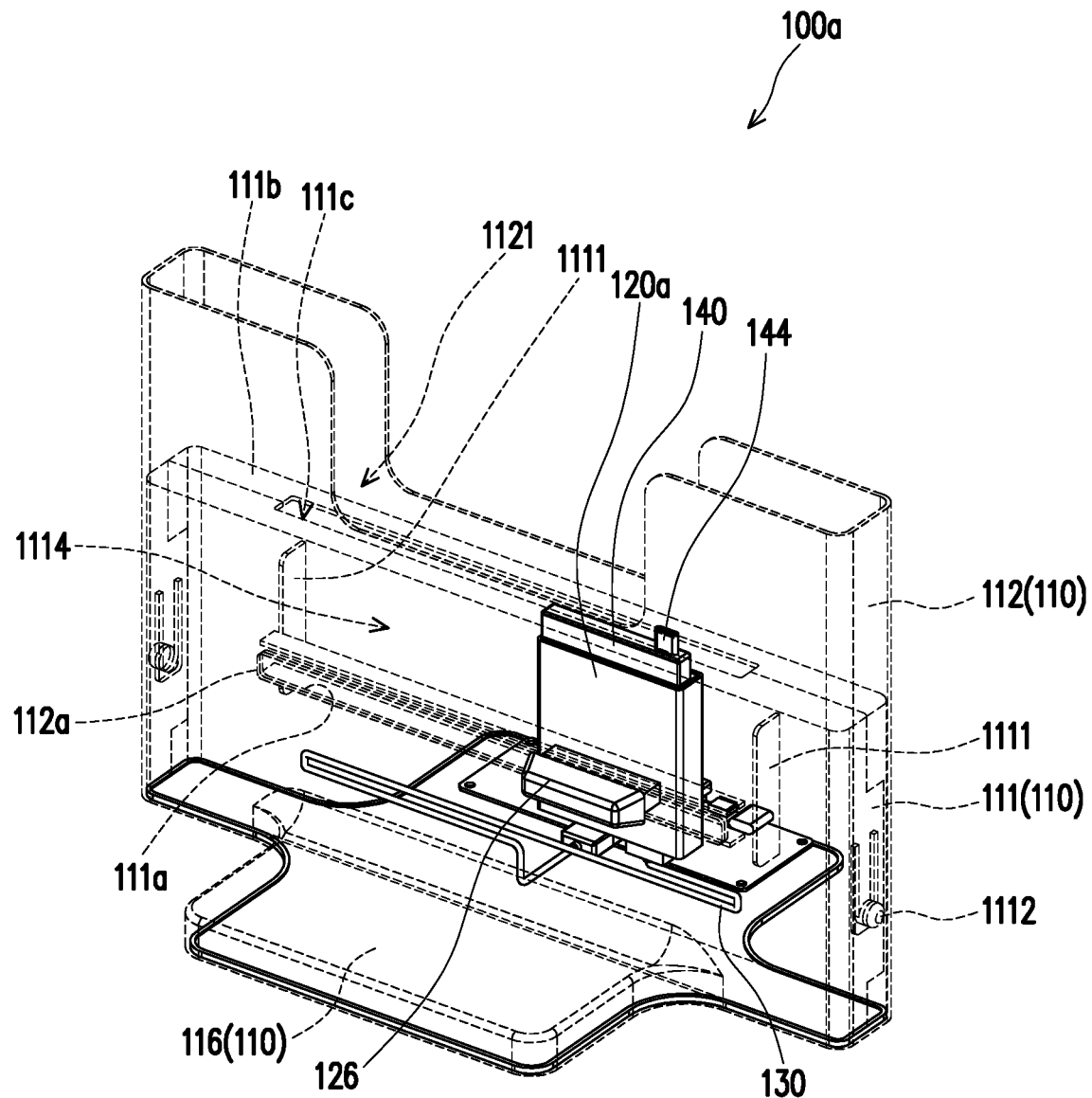
FIG. 4 is a schematic view of an expansion device according to another embodiment of the disclosure.
Figure 5A:
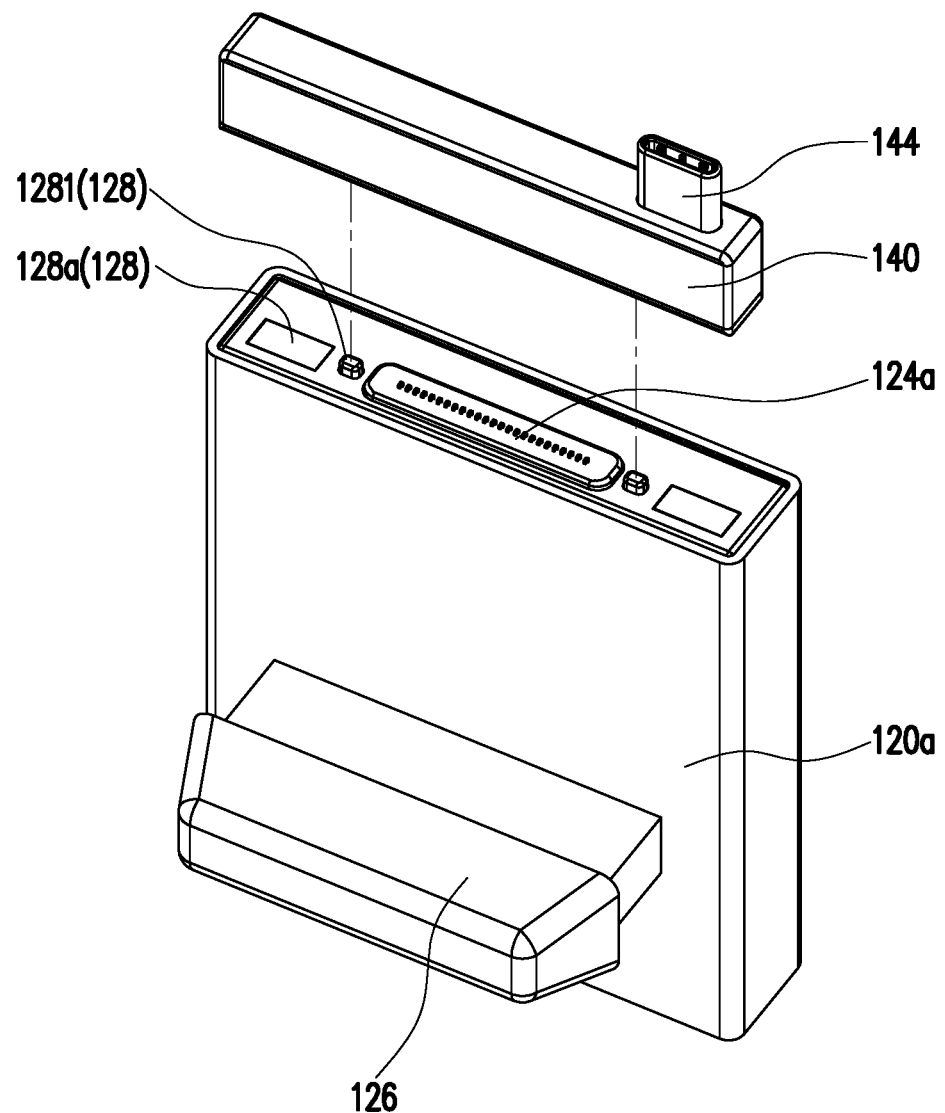
FIG. 5A is a schematic exploded view of a hub of FIG. 4.
Figure 5B:
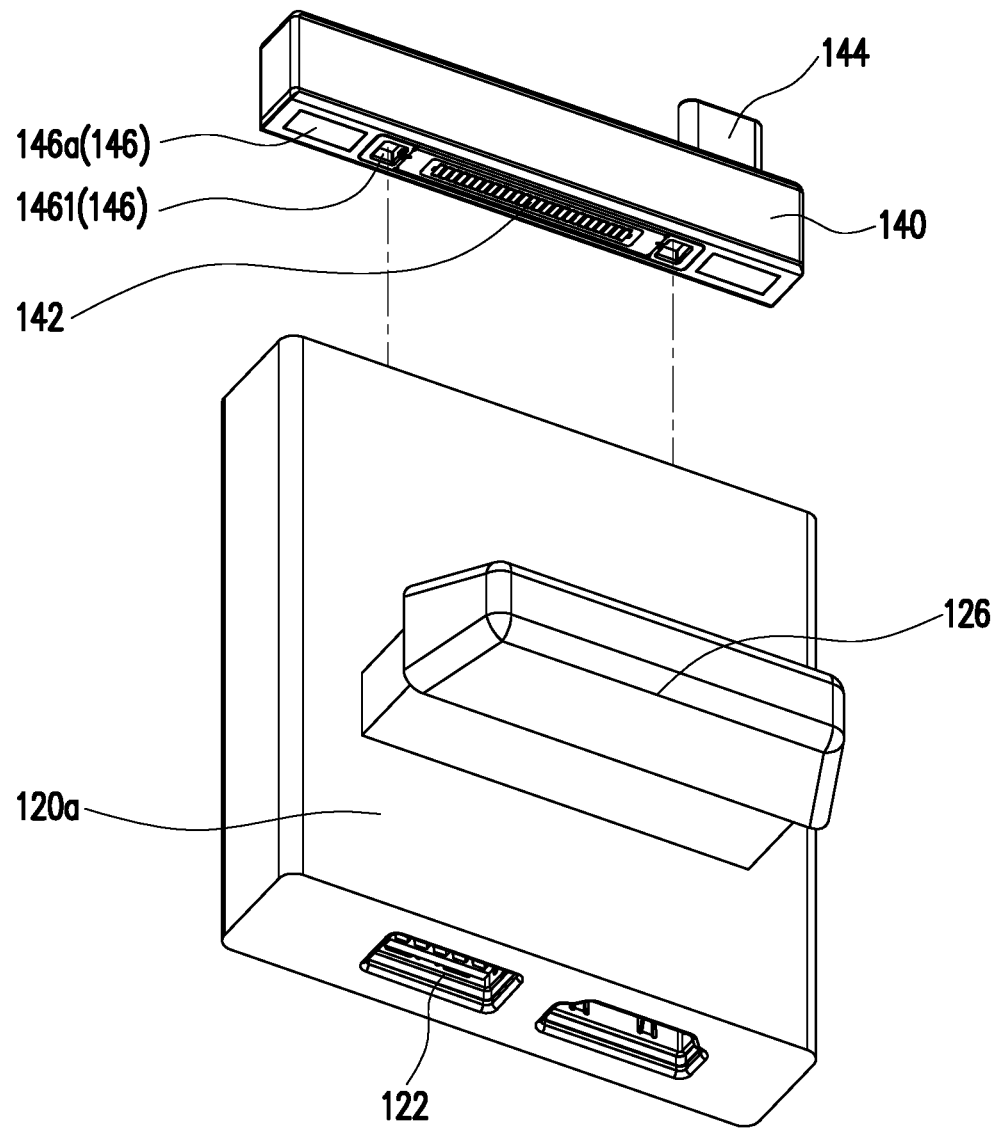
FIG. 5B is a schematic view of the hub of FIG. 5A from another perspective.

FIG. 4 is a schematic view of an expansion device according to another embodiment of the disclosure. FIG. 5A is a schematic exploded view of a hub of FIG. 4. FIG. 5B is a schematic view of the hub of FIG. 5A from another perspective. In particular, at least a part of the supporting base 110 of FIG. 4 is shown in broken lines to clearly present the structural configuration within the supporting base 110. Referring to FIG. 4, FIG. 5A, and FIG. 5B, compared to the expansion device 100 of the previous embodiment, an expansion device 100a of the present embodiment further includes an adapter 140. The adapter 140 is detachably disposed at a hub 120a and is located between the hub 120a and the insert slot 1121 or between the hub 120a and the bearing wall 111b.

In the present embodiment, a second electrical connection element 124a of the hub 120a is configured to electrically connect the adapter 140, and the adapter 140 is configured to electrically connect the electronic device inserted into the insert slot 1121 of the supporting portion 112. Specifically, the second electrical connection element 124a of the hub 120a is located within the slide slot 1114 and is oriented toward the insert slot 1121. On the other hand, the adapter 140 includes a third electrical connection element 142 and an electrical connection plug 144 facing away from the third electrical connection element 142. The third electrical connection element 142 is oriented toward the second electrical connection element 124a and is electrically connected to the second electrical connection element 124a. For example, the second electrical connection element 124a and the third electrical connection element 142 may be a combination of a conductive pad and a conductive terminal. On the other hand, the electrical connection plug 144 penetrates through the groove slot 111c of the case portion 111 to extend into the insert slot 1121, and the electrical connection plug 144 is slidable within the groove slot 111c. For example, the transmission specification of the electrical connection plug 144 may be USB, USB 2.0, USB 3.0, USB 3.1, USB 3.2, mini USB, micro USB, or USB Type C. The user may select the adapter 140 depending on the transmission specification of the electrical connection slot of the electronic device of different brands.

Therefore, when the electronic device is inserted into the insert slot 1121, the electrical connection plug 144 can be plugged into the electrical connection slot of the electronic device, so that the electronic device can be electrically connected to the electrical connection port 114 through the adapter 140, the hub 120a, and the switch circuit 130. In other words, the position of the electrical connection plug 144 in the insert slot 1121 may not only be adjusted according to the position of the electrical connection slot of the electronic device, but the transmission specification thereof may also be adjusted according to the transmission specification of the electrical connection slot of the electronic device.

To improve the convenience and reliability of mounting the adapter 140 and the hub 120a, the hub 120a further includes a first positioning portion 128. The first positioning portion 128 is adjacent to the second electrical connection element 124a, and the first positioning portion 128 and the second electrical connection element 124a are located at the same side of the hub 120a. On the other hand, the adapter 140 includes a second positioning portion 146. The second positioning portion 146 is adjacent to the third electrical connection element 142, and the second positioning portion 146 and the third electrical connection element 142 are located at the same side of the adapter 140. The first positioning portion 128 and the second positioning portion 146 face each other and are aligned with each other. By mechanical structural coordination or magnetic coordination, the user can quickly and accurately mount the adapter 140 to the hub 120a.

For example, the first positioning portion 128 may include a first magnetic element 128a, and the second positioning portion 146 may include a second magnetic element 146a. Through the coordination of the first magnetic element 128a and the second magnetic element 146a, the adapter 140 can be positioned at the hub 120a due to magnetic attraction. On the other hand, the first positioning portion 128 and the second positioning portion 146 may also include a coordinating concave-convex structure. The first positioning portion 128 may include a convex portion 1281 of the concave-convex structure, and the second positioning portion 146 may include a concave portion 1461 of the concave-convex structure. Through the coordination of the convex portion 1281 and the concave portion 1461 of the concave-convex structure, the adapter 140 can be locked to the hub 120a. In other embodiments, the first positioning portion may include a concave portion of the concave-convex structure, and the second positioning portion may include a convex portion of the concave-convex structure.

Figure 6:
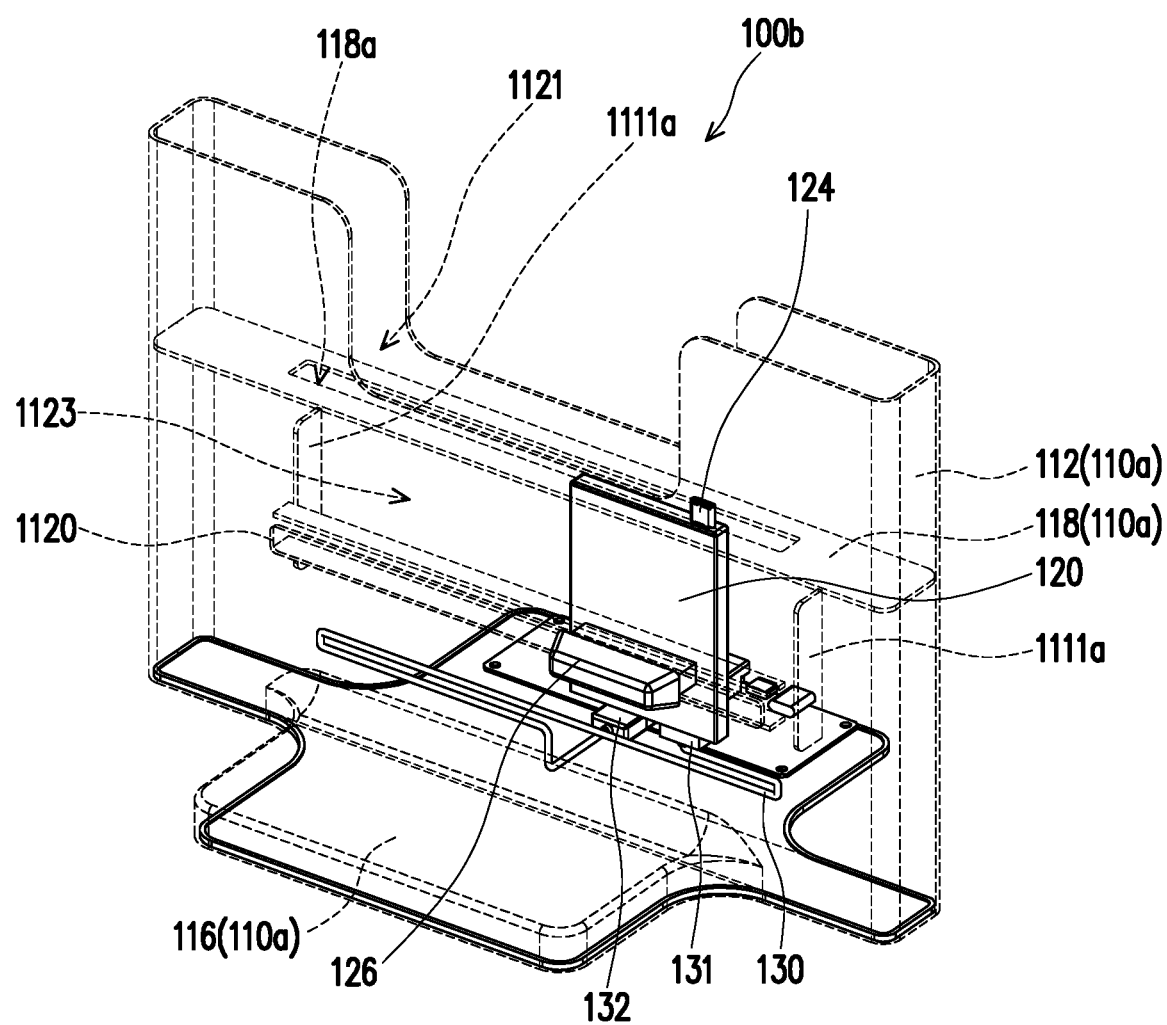
FIG. 6 is a schematic view of an expansion device according to still another embodiment of the disclosure.

FIG. 6 is a schematic view of an expansion device according to still another embodiment of the disclosure. In particular, at least a part of a supporting base 110a of FIG. 6 is shown in broken lines to clearly present the structural configuration within the supporting base 110a. Compared to the expansion device 100 of the previous embodiment, an expansion device 100b of the present embodiment does not have the case portion 111 (see FIG. 2A) disposed within the supporting base 110a, and the supporting base 110a further includes a bearing portion 118 located within the supporting portion 112. The bearing portion 118 is configured to support the electronic device and has a groove slot 118a. The supporting portion 112 further has a slide slot 1123 which houses the hub 120. The insert slot 1121 and the slide slot 1123 are separated by the bearing portion 118, and the insert slot 1121 and the slide slot 1123 are communicated with each other via the groove slot 118a. The second electrical connection element 124 of the hub 120 penetrates through the groove slot 118a to extend into the insert slot 1121. The protruding block 126 of the hub 120 is slidably disposed in a guide slot 1120 of the supporting portion 112 and penetrates out of the supporting portion 112 via the guide slot 1120.

In the present embodiment, two limiting protruding portions 1111a that are arranged side by side are disposed inside the supporting portion 112. The two limiting protruding portions 1111a may be used to substantially define the extending direction and the extending length of the slide slot 1123 and are located on the sliding path of the hub 120. Therefore, the sliding direction and the sliding stroke of the hub 120 may be substantially determined by the slide slot 1123 and the two limiting protruding portions 1111a.

Figure 7:
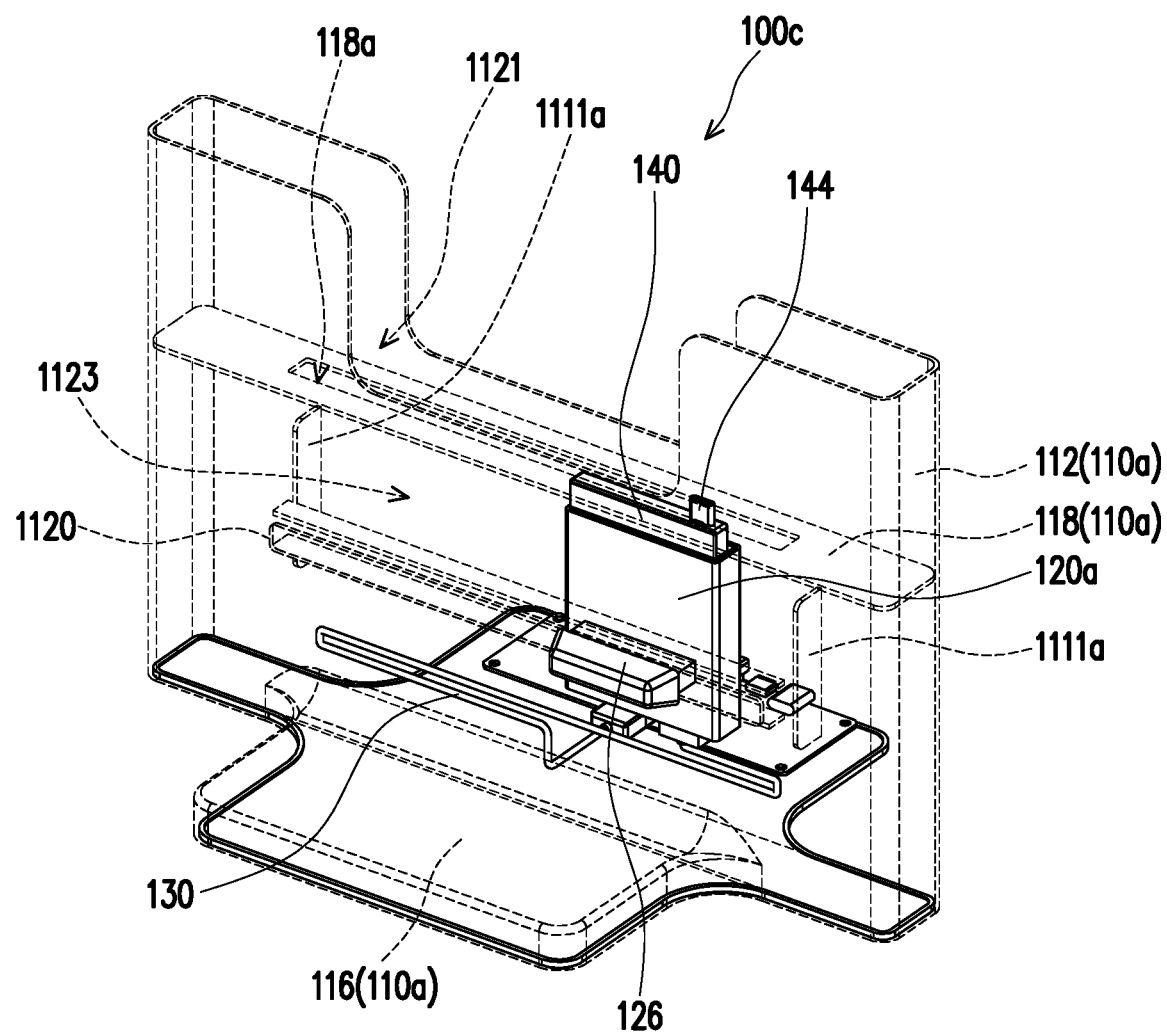
FIG. 7 is a schematic view of an expansion device according to still another embodiment of the disclosure.

FIG. 7 is a schematic view of an expansion device according to still another embodiment of the disclosure. In particular, at least a part of the supporting base 110a of FIG. 7 is shown in broken lines to clearly present the structural configuration within the supporting base 110a. Compared to the expansion device 100b shown in FIG. 6, an expansion device 100c of the present embodiment adopts the hub 120a and the adapter 140 shown in FIG. 4, FIG. 5A, and FIG. 5B instead. The adapter 140 is located between the bearing portion 118 and the hub 120a, and the electrical connection plug 144 of the adapter 140 penetrates through the groove slot 118a to extend into the insert slot 1121.

In summary of the above, in the expansion device of the disclosure, the position of the hub can be adjusted according to the position of the electrical connection slot of the electronic device. Accordingly, while the electronic device is mounted to the expansion device, the second electrical connection element of the hub can be accurately plugged into the electrical connection slot of the electronic device. On the other hand, the transmission specification of the electrical connection slot of the electronic device of different brands may be different (e.g., USB, USB 2.0, USB 3.0, USB 3.1, USB 3.2, mini USB, micro USB, or USB Type C), and the user can select the adapter according to the different transmission specifications of the electrical connection slot and mount the adapter on the hub. Specifically, the third electrical connection element of the adapter electrically connects the second electrical connection element of the hub, and the adapter can be plugged into the electrical connection slot of the electronic device through the electrical connection plug facing away from the third electrical connection element. In other words, the expansion device of the disclosure is widely applicable to electronic devices of different brands and is easy for the user to operate.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An expansion device comprising:
a supporting base, comprising a bottom portion, a supporting portion, and an electrical connection port, wherein the supporting portion is connected to the bottom portion and has an insert slot, and the electrical connection port is disposed at the bottom portion; and
a hub, slidably disposed within the supporting portion and located between the bottom portion and the insert slot, the hub comprising a first electrical connection element and a second electrical connection element facing away from the first electrical connection element, wherein the first electrical connection element is electrically connected to the electrical connection port, and the second electrical connection element extends into the insert slot.

2. The expansion device according to claim 1, further comprising a switch circuit slidably disposed within the supporting portion, wherein the switch circuit is located between the hub and the bottom portion and is configured to electrically connect the first electrical connection element and the electrical connection port.

3. The expansion device according to claim 1, wherein the hub further comprises a protruding block and the protruding block is located between the first electrical connection element and the second electrical connection element, and the supporting portion is provided with a guide slot, wherein the protruding block is slidably disposed in the guide slot and penetrates out of the supporting portion.

4. The expansion device according to claim 1, wherein the supporting base further comprises a bearing portion located within the supporting portion, the supporting portion further has a slide slot, and the insert slot and the slide slot are separated by the bearing portion, wherein the hub is located within the slide slot, the bearing portion has a groove slot communicating the insert slot and the slide slot, and the second electrical connection element is slidably disposed in the groove slot and penetrates through the groove slot to extend into the insert slot.

5. The expansion device according to claim 1, wherein the supporting base further comprises a case portion detachably disposed within the supporting portion, and the case portion is located between the bottom portion and the insert slot, wherein the hub is slidably disposed within the case portion, and the second electrical connection element penetrates out of the case portion to extend into the insert slot.

6. The expansion device according to claim 5, wherein the case portion has a slide slot, the hub is located within the slide slot, and the case portion comprises a bearing wall oriented toward the insert slot, wherein the insert slot and the slide slot are separated by the bearing wall, the bearing wall has a groove slot communicating the insert slot and the slide slot, and the second electrical connection element is slidably disposed in the groove slot and penetrates through the groove slot to extend into the insert slot.

7. The expansion device according to claim 5, wherein a positioning hole is provided at an inner side of the supporting portion, an elastic positioning element corresponding to the positioning hole is provided at an outer side of the case portion, and the elastic positioning element is configured to lock into the positioning hole.

8. The expansion device according to claim 5, wherein the hub further comprises a protruding block and the protruding block is located between the first electrical connection element and the second electrical connection element, the case portion is provided with a first guide slot, and the supporting portion is provided with a second guide slot aligned with the first guide slot, wherein the protruding block is slidably disposed in the first guide slot and the second guide slot and penetrates out of the supporting portion.

9. An expansion device comprising:
a supporting base, comprising a bottom portion, a supporting portion, and an electrical connection port, wherein the supporting portion is connected to the bottom portion and has an insert slot, and the electrical connection port is disposed at the bottom portion;
a hub, slidably disposed within the supporting portion and located between the bottom portion and the insert slot, the hub comprising a first electrical connection element, a second electrical connection element facing away from the first electrical connection element, and a first positioning portion adjacent to the second electrical connection element, wherein the first electrical connection element is electrically connected to the electrical connection port, and the second electrical connection element and the first positioning portion are oriented toward the insert slot; and
an adapter, detachably disposed at the hub and located between the hub and the insert slot, wherein the adapter comprises a third electrical connection element electrically connected to the second electrical connection element, a second positioning portion adjacent to the third electrical connection element, and an electrical connection plug facing away from the third electrical connection element, wherein the first positioning portion directly faces the second positioning portion, and the electrical connection plug extends into the insert slot.

10. The expansion device according to claim 9, further comprising a switch circuit slidably disposed within the supporting portion, wherein the switch circuit is located between the hub and the bottom portion and is configured to electrically connect the first electrical connection element and the electrical connection port.

11. The expansion device according to claim 9, wherein the hub further comprises a protruding block and the protruding block is located between the first electrical connection element and the second electrical connection element, and the supporting portion is provided with a guide slot, wherein the protruding block is slidably disposed in the guide slot and penetrates out of the supporting portion.

12. The expansion device according to claim 9, wherein the supporting base further comprises a bearing portion located within the supporting portion, the supporting portion further has a slide slot, and the insert slot and the slide slot are separated by the bearing portion, wherein the hub and the adapter are located within the slide slot, the bearing portion has a groove slot communicating the insert slot and the slide slot, and the electrical connection plug is slidably disposed in the groove slot and penetrates through the groove slot to extend into the insert slot.

13. The expansion device according to claim 9, wherein the supporting base further comprises a case portion detachably disposed within the supporting portion, and the case portion is located between the bottom portion and the insert slot, wherein the hub and the adapter are slidably disposed within the case portion, and the electrical connection plug penetrates out of the case portion to extend into the insert slot.

14. The expansion device according to claim 13, wherein the case portion has a slide slot, the hub and the adapter are located within the slide slot, and the case portion comprises a bearing wall facing the insert slot, wherein the insert slot and the slide slot are separated by the bearing wall, the bearing wall has a groove slot communicating the insert slot and the slide slot, and the electrical connection plug is slidably disposed in the groove slot and penetrates through the groove slot to extend into the insert slot.

15. The expansion device according to claim 13, wherein a positioning hole is provided at an inner side of the supporting portion, an elastic positioning element corresponding to the positioning hole is provided at an outer side of the case portion, and the elastic positioning element is configured to lock into the positioning hole.

16. The expansion device according to claim 13, wherein the hub further comprises a protruding block and the protruding block is located between the first electrical connection element and the second electrical connection element, the case portion is provided with a first guide slot, and the supporting portion is provided with a second guide slot aligned with the first guide slot, wherein the protruding block is slidably disposed in the first guide slot and the second guide slot and penetrates out of the supporting portion.

17. The expansion device according to claim 9, wherein the first positioning portion comprises a first magnetic element, the second positioning portion comprises a second magnetic element, and the first magnetic element is magnetically attracted to the second magnetic element.

18. The expansion device according to claim 9, wherein the first positioning portion and the second positioning portion comprise a coordinating concave-convex structure.

* * * * *